(12) United States Patent
Hariri et al.

(10) Patent No.: US 12,265,784 B2
(45) Date of Patent: *Apr. 1, 2025

(54) PEOPLE SUGGESTION IN COLLABORATIVE ONLINE TEXT EDITORS

(71) Applicant: GOOGLE LLC, Mountain View, CA (US)

(72) Inventors: Behnoosh Hariri, New York, NY (US); Ali Abdelhadi, New York, NY (US); Zifan Xiang, Brooklyn, NY (US); Timothy Chen, Long Island City, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,707

(22) Filed: Dec. 19, 2023

(65) Prior Publication Data
US 2024/0126982 A1    Apr. 18, 2024

Related U.S. Application Data

(63) Continuation of application No. 17/469,685, filed on Sep. 8, 2021, now Pat. No. 11,861,296.

(51) Int. Cl.
*G06F 40/166* (2020.01)
*G06F 16/176* (2019.01)
(Continued)

(52) U.S. Cl.
CPC .......... *G06F 40/166* (2020.01); *G06F 40/134* (2020.01); *G06F 16/1774* (2019.01); *G06F 40/169* (2020.01)

(58) Field of Classification Search
CPC ............................. G06F 40/166; G06F 40/134
See application file for complete search history.

(56) References Cited

U.S. PATENT DOCUMENTS 7,634,732 B1    12/2009  Blagsvedt
8,726,171 B1    5/2014   Lachapelle et al.
(Continued)

FOREIGN PATENT DOCUMENTS

EP    2328101    6/2011

OTHER PUBLICATIONS

European Patent Office; International Search Report and Written Opinion issued in Application No. PCT/US2022/042800: 10 pages; dated Dec. 12, 2022.

*Primary Examiner* — Asher D Kells
(74) *Attorney, Agent, or Firm* — Gray Ice Higdon

(57) ABSTRACT

Techniques are described herein for providing people suggestions in collaborative online text editors. A method includes: receiving user interface input that corresponds to a document in a document editing application; automatically parsing the received user interface input to identify a name included in the user interface input; in response to identifying the name included in the user interface input, providing an option to create a link in the document between the name and a corresponding contact in a contact store; receiving additional user interface input that indicates acceptance of the option to create the link in the document; and in response to receiving the additional user interface input, automatically creating the link in the document between the name and the corresponding contact in the contact store.

18 Claims, 6 Drawing Sheets

(51) Int. Cl.
*G06F 40/134* (2020.01)
*G06F 40/169* (2020.01)

(56) References Cited

U.S. PATENT DOCUMENTS

| | | | |
|---|---|---|---|
| 8,935,613 | B1 | 1/2015 | Lachapelle et al. |
| 9,092,400 | B1 | 7/2015 | Lin et al. |
| 9,456,012 | B2 | 9/2016 | Cohen |
| 9,582,482 | B1 | 2/2017 | Sharifi et al. |
| 10,628,483 | B1 * | 4/2020 | Rao .................. G06F 16/683 |
| 2005/0076013 | A1 * | 4/2005 | Hilbert .................. G06Q 10/10 |
| 2011/0067087 | A1 | 3/2011 | Thornton et al. |
| 2012/0278281 | A1 | 11/2012 | Meisels et al. |
| 2012/0330993 | A1 | 12/2012 | Faiman et al. |
| 2012/0331108 | A1 | 12/2012 | Ferdowsi et al. |
| 2013/0108161 | A1 | 5/2013 | Carr |
| 2013/0218902 | A1 | 8/2013 | Vendrow et al. |
| 2014/0046921 | A1 | 2/2014 | Bau |
| 2014/0214863 | A1 | 7/2014 | Rottler et al. |
| 2014/0289176 | A1 | 9/2014 | Zhang |
| 2015/0127603 | A1 | 5/2015 | Cohen |
| 2015/0143255 | A1 | 5/2015 | Agrawal et al. |
| 2017/0083211 | A1 | 3/2017 | Ramkumar |
| 2017/0353466 | A1 | 12/2017 | Weaver et al. |
| 2019/0102393 | A1 | 4/2019 | Horling et al. |
| 2019/0259387 | A1 | 8/2019 | Timo |
| 2020/0153765 | A1 | 5/2020 | Burbank et al. |
| 2020/0349943 | A1 | 11/2020 | Elangovan et al. |
| 2023/0070888 | A1 | 3/2023 | Hariri et al. |

\* cited by examiner

PEOPLE SUGGESTION IN COLLABORATIVE ONLINE TEXT EDITORS

BACKGROUND

Collaborative online document editors (e.g., text editors) may allow multiple users to collaboratively create, view, and edit documents. For example, a collaborative online text editor may allow users who are members of a particular team within a company or other organization to collaborate on a particular document by making edits (e.g., revisions) to the document in a synchronous manner and/or in an asynchronous manner.

When users are collaboratively working on a particular document, a user may refer to another user within the document. In an example, a user who is a member of a particular team may refer to one or more other team members who are responsible for a particular task described in the document. In another example, a user may pose a question to another user in the document.

Collaborative online editors may lack a reliable and convenient way to refer to other users (e.g., other team members) in documents. Additionally, collaborative online editors may not provide viewers of a document with a convenient way to get more information (e.g., contact information, etc.) about a person who is mentioned in a document. Accordingly, excess computing resources may be consumed as users manually access and search contact directories to obtain contact information for other users mentioned in a document.

Access to documents may be controlled by permissions, such that only users who have been granted access to a particular document are permitted to view and/or modify the document. A user who is mentioned in a document may not have access to the document unless another user with access to the document manually grants permission to the user who is mentioned in the document.

SUMMARY

Techniques described herein relate to providing people suggestions in collaborative online text editors. In various implementations, a collaborative online text editor provides functionality for easily searching and referencing other people in a document. Additionally, in various implementations, a collaborative online text editor provides functionality for users who are viewing a document to be able to see an information card when hovering over a reference to a person. The information card may display information associated with the person that is stored in a contact store. Furthermore, in various implementations, a collaborative online text editor provides an option to automatically share a document with a person who is referenced in the document.

In various implementations, a method implemented by one or more processors may include: receiving user interface input that corresponds to a document in a document editing application; automatically parsing the received user interface input to identify a name included in the user interface input; in response to identifying the name included in the user interface input, providing an option to create a link in the document between the name and a corresponding contact in a contact store; receiving additional user interface input that indicates acceptance of the option to create the link in the document; and in response to receiving the additional user interface input, automatically creating the link in the document between the name and the corresponding contact in the contact store.

In some implementations, the method may further include, in response to automatically creating the link, determining whether or not the corresponding contact has permission to access the document; and in response to determining that the corresponding contact does not have permission to access the document, providing an option to share the document with the corresponding contact. In some implementations, the method further includes receiving further user interface input that indicates acceptance of the option to share the document with the corresponding contact; and in response to receiving the further user interface input, automatically sharing the document with the corresponding contact.

In some implementations, automatically parsing the received user interface input to identify the name included in the user interface input may include determining that one or more words in the received user interface input corresponds to at least a first name or a last name of the corresponding contact in the contact store.

In some implementations, the method may further include determining a confidence score associated with the name. The providing the option to create the link may be based on the confidence score satisfying a threshold.

In some implementations, the method may further include receiving further user interface input associated with the link; and in response to receiving the further user interface input, displaying information associated with the corresponding contact in the contact store. In some implementations, the method may further include, in response to automatically creating the link, sending a notification to the corresponding contact.

In some additional or alternative implementations, a computer program product may include one or more computer-readable storage media having program instructions collectively stored on the one or more computer-readable storage media. The program instructions may be executable to: receive user interface input that corresponds to a document in a document editing application; determine that one or more words in the received user interface input correspond to at least two names of a plurality of names in a contact directory; determine, for each of the at least two names, a confidence score; select a name in the contact directory from the at least two names based on the confidence scores; and automatically create a link in the document between the one or more words and a contact in the contact directory that is associated with the selected name.

In some implementations, the program instructions may be further executable to: in response to automatically creating the link, determine whether or not the contact has permission to access the document; and in response to determining that the contact does not have permission to access the document, provide an option to share the document with the contact. In some implementations, the program instructions may be further executable to: receive further user interface input that indicates acceptance of the option to share the document with the contact; and in response to receiving the further user interface input, automatically share the document with the contact.

In some implementations, selecting the name in the contact directory and automatically creating the link in the document may be in response to at least one of the confidence scores satisfying a threshold.

In some implementations, the program instructions may be further executable to: provide an option to create a link in the document between the one or more words and the contact in the contact directory that is associated with the selected name; and receive additional user interface input that indicates acceptance of the option to create the link in the document. The automatically creating the link in the document may be in response to receiving the additional user interface input.

In some implementations, the program instructions may be further executable to: receive further user interface input associated with the link; and in response to receiving the further user interface input, display information associated with the contact in the contact directory.

In some additional or alternative implementations, a system may include a processor, a computer-readable memory, one or more computer-readable storage media, and program instructions collectively stored on the one or more computer-readable storage media. The program instructions may be executable to: receive user interface input that corresponds to a document in a document editing application; automatically parse the received user interface input to identify a name included in the user interface input; in response to identifying the name included in the user interface input, provide an option to create a link in the document between the name and a corresponding contact in a contact store; receive additional user interface input that indicates acceptance of the option to create the link in the document; and in response to receiving the additional user interface input, automatically create the link in the document between the name and the corresponding contact in the contact store.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
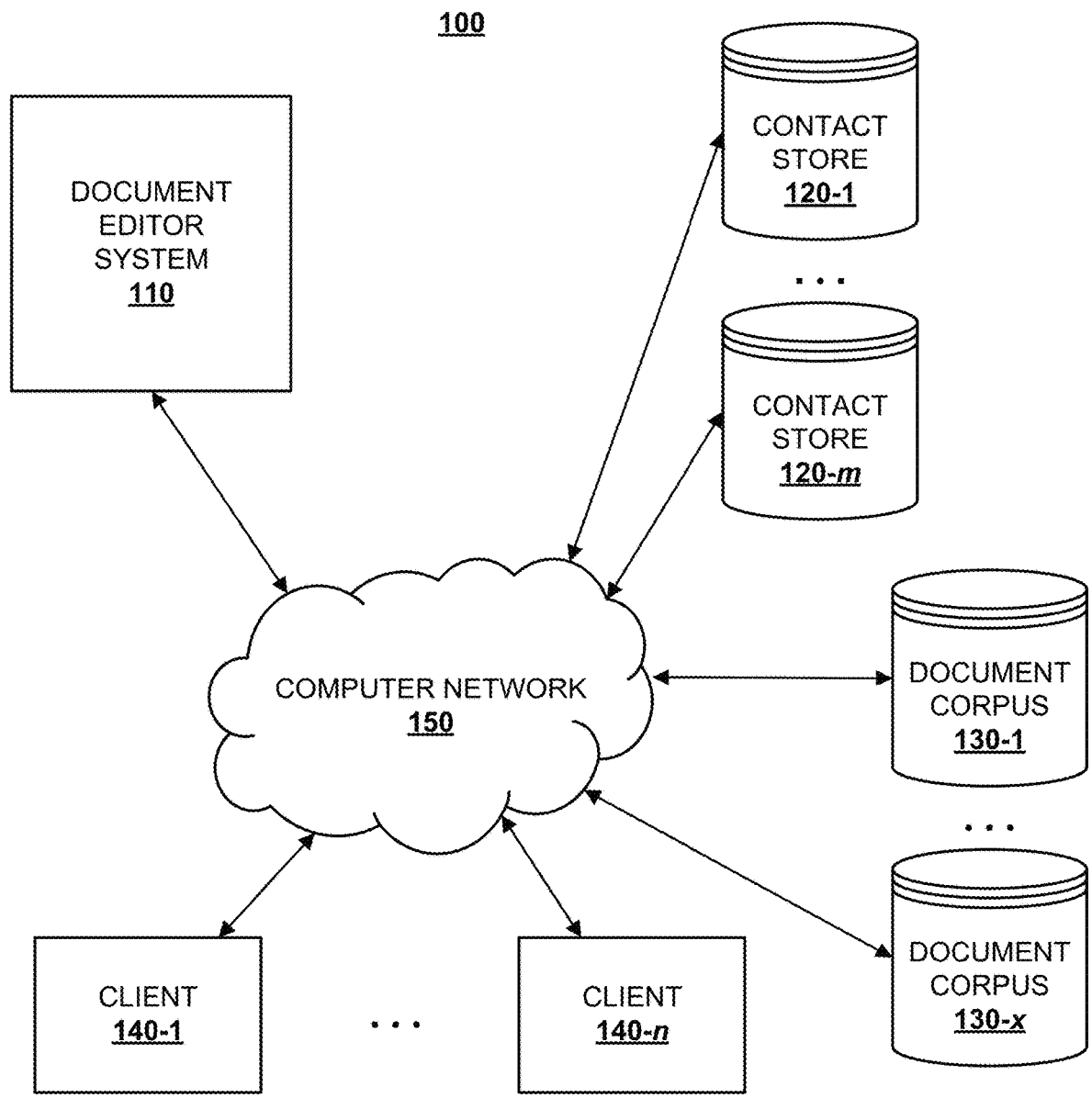
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations.

Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a document editor system 110, may be implemented using one or more server computing devices that form what is sometimes referred to as a "cloud infrastructure," although this is not required.

In implementations, the environment 100 may include a document editor system 110 that implements an online document editor application (e.g., a collaborative online text editor or word processer) that is accessible from various clients, including clients 140-1, . . . , 140-n that may be included in the environment 100, through either a thin client interface, such as a web browser (e.g., a web-based collaborative online text editor application), or a program interface. In implementations, the online document editor application that is implemented by the document editor system 110 may be a software as a service (SaaS) document editor application. The document editor system 110 and the clients 140-1, . . . , 140-n may be in communication via a computer network 150, which may be any suitable network including any combination of a local area network (LAN), wide area network (WAN), or the Internet. The document editor system 110 may be configured to perform selected aspects of the present disclosure in order to automatically provide people suggestions in documents that are created, modified, and/or viewed using one or more of the clients 140-1, . . . , 140-n.

Each of the clients 140-1, . . . , 140-n may be, for example, a user computing device that is used by a user to access a document editor application via a document editor application user interface, such as a SaaS document editor application, that is provided by the document editor system 110, e.g., through a web browser. In an example, the clients 140-1, . . . , 140-n may be user computing devices associated with an individual or an entity or organization such as a business (e.g., financial institute, bank, etc.), non-profit, club, university, government agency, or any other organization that uses a document editor application. For example, a business may operate a document editor application to create, modify, and/or view one or more documents to manage reports, proposals, financial records, business records, client lists, and so forth.

In various implementations, each of the clients 140-1, . . . , 140-n may include one or more user interface input devices such as a physical keyboard, a touch screen, and/or a microphone, to name a few. Additionally, each of the clients 140-1, . . . , 140-n may include one or more user interface output devices such as a display screen, a haptic feedback device, and/or speaker(s), to name a few.

In various implementations, the environment 100 may include contact stores 120-1, . . . , 120-m that are accessible to the clients 140-1, . . . , 140-n via the computer network 150 or another network. Each of the contact stores 120-1, . . . , 120-m may include information about multiple contacts (e.g., persons). For example, the contact stores 120-1, . . . , 120-m may be databases that store contact information for multiple contacts, such as email addresses, physical addresses, telephone numbers, user names, etc.

In various implementations, the environment 100 may include document corpuses 130-1, . . . , 130-x that are accessible to the clients 140-1, . . . , 140-n via the computer network 150 or another network. Each of the document corpuses 130-1, . . . , 130-x may include multiple documents (e.g., text documents) created by one or more of the clients 140-1, . . . , 140-n, e.g., using the document editor system 110. In an example, the document corpuses 130-1, . . . , 130-x may include a set of documents created, edited, or viewed by users of one or more of the clients 140-1, . . . , 140-n associated with a particular entity or organization. Each of the documents stored in the document corpuses 130-1, . . . , 130-x may be associated with a set of permissions which may, as an example, define users and/or groups who have access to view and/or edit the document.

The document editor system 110 may be configured to automatically provide people suggestions in documents that are created, modified, and/or viewed using one or more of the clients 140-1, . . . , 140-n. For example, the document editor system 110 may be configured to receive, from one of the clients 140-1, . . . , 140-n, user interface input that corresponds to a document in a document editing application. The document editor system 110 may be configured to automatically parse the received user interface input to identify a name included in the user interface input and, in response to identifying the name included in the user interface input, provide an option to create a link in the document between the name and a corresponding contact in a contact store 120-1, . . . , 120-m. The document editor system 110 may be configured to receive additional user interface input from one of the clients 140-1, . . . , 140-n that indicates acceptance of the option to create the link in the document, and in response to receiving the additional user interface input, automatically create the link in the document between the name and the corresponding contact in the contact store 120-1, . . . , 120-m.

Figure 2:
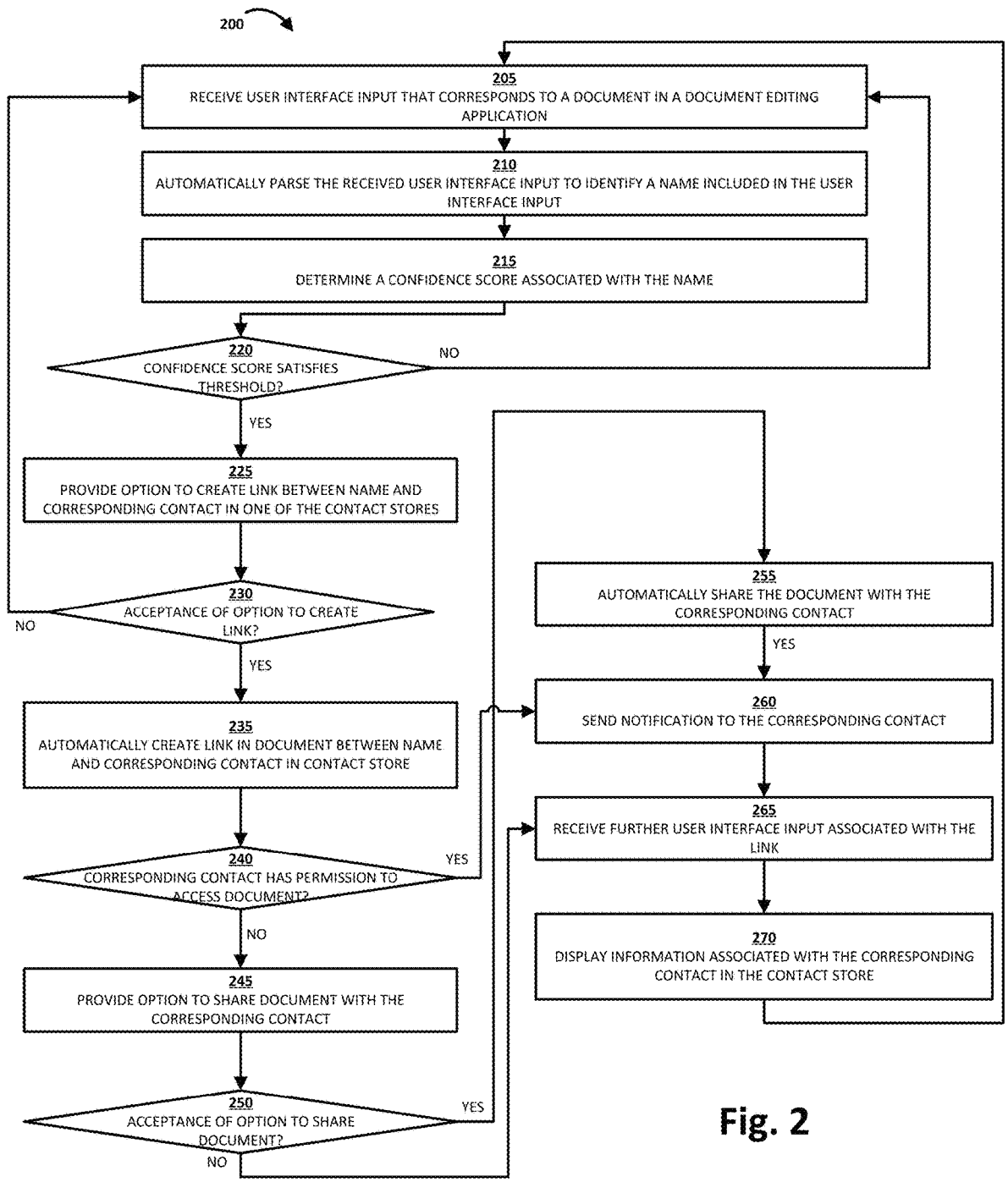
FIG. 2 and FIG. 3 depict flowcharts illustrating example methods of providing people suggestions in collaborative online text editors.

FIG. 2 depicts a flowchart illustrating an example method 200 of automatically providing people suggestions in documents. For convenience, the operations of the method 200 are described with reference to a system that performs the operations. This system of method 200 includes one or more processors and/or other component(s) of various computer systems. Moreover, while operations of method 200 are shown in a particular order, this is not meant to be limiting. One or more operations may be reordered, omitted, or added.

At block 205, the system receives user interface input that corresponds to a document in a document editing application. In some implementations, a document editing application (document editor) rendered by a web browser may be displayed on one or more of the user interface output devices of one of the clients 140-1, . . . , 140-n. The user may use one or more of the user interface input devices of one of the clients 140-1, . . . , 140-n to provide the user interface input that is received by the document editing system 110. In some implementations, the user interface input may include one or more characters or words input into a document in the document editing application via a keyboard (e.g., a physical keyboard or an on-screen keyboard) or a microphone of one of the clients 140-1, . . . , 140-n.

At block 210, the system automatically parses the received user interface input to identify a name included in the user interface input. In some implementations, the document editing system 110 parses the user interface input received at block 205 to determine whether or not any of the characters or words input into the document in the document editing system 110 are a name that matches a corresponding contact in one of the contact stores 120-1, . . . , 120-m. In particular, in some implementations, the document editing system 110 may determine that one or more words in the user interface input received at block 205 corresponds to at least a first name or a last name of the corresponding contact in one of the contact stores 120-1, . . . , 120-m.

At block 215, the system determines a confidence score associated with the name. In some implementations, the document editing system 110 determines a first confidence score associated with the name based upon a strength of the match between the name and the corresponding contact at block 210. For example, the document editing system 110 may determine a relatively lower confidence score in the case of a partial match, and the document editing system 110 may determine a relatively higher confidence score in the case of a complete match.

Still referring to block 215, in some implementations, the document editing system 110 also determines a second confidence score based on a likelihood of the word that was identified at block 210 being a name. The document editing system 110 may determine the second confidence score based on the context of a sentence (or set of words) that surrounds the word that was identified at block 210 (i.e., based on a current sentence that is being typed). As an example, one of the contact stores 120-1, . . . , 120-m may include a contact "Will Smith". In a first case, if the user interface input received at block 205 includes the phrase "Please chat with Will", the word "Will" may be identified at block 210 as a name. At block 215, the document editing system 110 may determine a relatively higher second confidence score based on a relatively higher likelihood of the word "Will" being a name. In a second case, if the user interface input received at block 205 includes the phrase "These things will", the word "will" may be identified at block 215 as a name. However, at block 215, the document editing system 110 may determine a relatively lower second confidence score, as compared to the first case, based on a relatively lower likelihood of the word "will" being a name.

At block 220, the system determines whether or not the confidence score satisfies a threshold. In some implementations, the document editing system 110 determines whether or not the first confidence score satisfies a first confidence score threshold and/or the second confidence score determined at block 215 satisfies a second confidence score threshold. If the document editing system 110 determines that the first confidence score and/or the second confidence score does not satisfy the respective threshold (e.g., there is not a sufficiently strong match between the user interface input received at block 205 and a contact in one of the contact stores 120-1, . . . , 120-m, and/or there is not a sufficiently high likelihood of the word that was identified at block 210 being a name), then the flow returns to block 205. On the other hand, if the document editing system 110 determines that the first confidence score and the second confidence score satisfy the respective thresholds (e.g., there is a sufficiently strong match between the user interface input received at block 205 and a contact in one of the contact stores 120-1, . . . , 120-m, and there is a sufficiently high likelihood of the word that was identified at block 210 being a name), then the flow proceeds to block 225.

Still referring to block 220, continuing with the example above, given that one of the contact stores 120-1, . . . , 120-m includes the contact "Will Smith", in both the first case and the second case, the document editing system 110 may determine that the first confidence score satisfies the first threshold based on there being a sufficiently strong match between the user interface input received at block 205 ("Please chat with Will" in the first case and "These things will" in the second case) and the contact "Will Smith" in one of the contact stores 120-1, . . . , 120-m. The document editing system 110 may determine that the second confidence score satisfies the second threshold in the first case, based on a sufficiently high likelihood of the word "Will" being a name in the phrase "Please chat with Will". However, the document editing system 110 may determine that the second confidence score does not satisfy the second threshold in the second case, based on there not being a sufficiently high likelihood of the word "will" being a name in the phrase "These things will".

At block 225, in response to identifying the name included in the user interface input at block 210 and determining that the confidence score satisfies the threshold at block 220, the system provides an option to create a link in the document between the name and the corresponding contact in one of the contact stores 120-1, ..., 120-m. In some implementations, the document editing system 110 provides the option to create the link in the document between the name and the corresponding contact in one of the contact stores 120-1, ..., 120-m in response to both the first confidence score satisfying the first threshold and the second confidence score satisfying the second threshold at block 220. If either or both of the first confidence score and the second confidence score do not satisfy their respective thresholds, then the document editing system 110 may avoid providing the option to create the link in the document.

Still referring to block 225, in some implementations, the document editing system 110 causes a dialog box, pop-up, tool tip, or overlay to appear on the user interface of the document editor on one of the clients 140-1, ..., 140-n that provides the user with the option to create a link that may be selected by clicking or tapping on or adjacent to the name in the document. In other implementations, the document editing system 110 causes the name to appear in a different font and/or color (e.g., gray) on the user interface of the document editor on one of the clients 140-1, ..., 140-n to indicate the option to create the link in the document between the name and the corresponding contact in one of the contact stores 120-1, ..., 120-m.

At block 230, the system determines whether or not additional user interface input that indicates acceptance of the option to create the link in the document has been received. In some implementations, the document editing system 110 determines whether or not additional user interface input that indicates acceptance of the option to create the link in the document, provided at block 225, has been received (e.g., via one or more of the user interface input devices of one of the clients 140-1, ..., 140-n). If the document editing system 110 determines that the additional user interface input that indicates acceptance of the option to create the link has not been received, then the flow returns to block 205. On the other hand, if the document editing system 110 determines that the additional user interface input that indicates acceptance of the option to create the link has been received, then the flow proceeds to block 235.

Still referring to block 230, in an example, the additional user interface input may include a selection of button (e.g., "Yes" or "Accept" to accept the option to create a link, or "No" or "Decline" to decline the option to create a link) in a dialog box, pop-up, tool tip, or overlay provided at block 225. In another example, the additional user interface input may include a keystroke or keystroke combination (e.g., tab to accept the option to create a link, or escape to decline the option to create a link) or a voice command (e.g., "Accept" or "Decline").

Still referring to block 230, in some implementations, a user may have the option to not take any action in response to the option to create the link in the document between the name and the corresponding contact in one of the contact stores 120-1, ..., 120-m provided at block 225. In this case, the document editing system 110 may initially determine, subject to change based on later-received user interface input, that the user has declined the option to create the link between the name and the corresponding contact.

At block 235, in response to receiving the additional user interface input that indicates acceptance of the option to create the link in the document, the system automatically creates the link in the document between the name and the corresponding contact in the contact store. In some implementations, in response to receiving the additional user interface input at block 230 that indicates acceptance of the option to create the link in the document, the document editing system 110 automatically creates the link in the document between the name identified at block 210 and the corresponding contact in one of the contact stores 120-1, ..., 120-m.

At block 240, in response to automatically creating the link, the system determines whether or not the corresponding contact has permission to access the document. In some implementations, in response to automatically creating the link at block 235, the document editing system 110 determines whether or not the corresponding contact has permission to access the document (e.g., view and/or edit), for example, based on a set of permissions which may, as an example, be stored with or in association with the document in one of the document corpuses 130-1, ..., 130-x (e.g., as metadata) or in another location.

Still referring to block 240, if the document editing system 110 determines that the corresponding contact does not have permission to access the document, then the flow proceeds to block 245. On the other hand, if the document editing system 110 determines that the corresponding contact has permission to access the document, then the flow proceeds to block 260.

At block 245, in response to determining that the corresponding contact does not have permission to access the document, the system provides an option to share the document with the corresponding contact. In some implementations, the document editing system 110 causes a dialog box, pop-up, tool tip, or overlay to appear on the user interface of the document editor on one of the clients 140-1, ..., 140-n that provides the user with the option to share the document with the corresponding contact (i.e., the contact linked at block 235).

At block 250, the system determines whether or not further user interface input that indicates acceptance of the option to share the document with the corresponding contact has been received. In some implementations, the document editing system 110 determines whether or not further user interface input that indicates acceptance of the option to share the document with the corresponding contact, provided at block 245, has been received (e.g., via one or more of the user interface input devices of one of the clients 140-1, ..., 140-n). If the document editing system 110 determines that the further user interface input that indicates acceptance of the option to share the document with the corresponding contact has been received, then the flow proceeds to block 255. On the other hand, if the document editing system 110 determines that the further user interface input that indicates acceptance of the option to share the document with the corresponding contact has not been received, then the flow proceeds to block 265.

Still referring to block 250, in an example, the further user interface input may include a selection of button (e.g., "Yes" or "Accept" to accept the option to share the document with the corresponding contact, or "No" or "Decline" to decline the option to share the document with the corresponding contact) in a dialog box, pop-up, tool tip, or overlay provided at block 245. In another example, the further user interface input may include a keystroke or keystroke combination (e.g., tab to accept the option to share the document with the corresponding contact, or escape to decline the option to share the document with the corresponding contact) or a voice command (e.g., "Accept" or "Decline").

Still referring to block 250, in some implementations, a user may have the option to not take any action in response to the option to share the document with the corresponding contact provided at block 245. In this case, the document editing system 110 may initially determine, subject to change based on later-received user interface input, that the user has declined the option to share the document with the corresponding contact. The document editing system 110 may also provide an option to "don't show again", which may prevent another sharing prompt from showing up when a user creates a link between a name and a corresponding contact within the same session (e.g., if a user selects "don't show again" but then refreshes and creates another link between a name and a contact, the user may once again be shown the prompt to share based on being in a new session).

At block 255, in response to receiving the further user interface input, the system automatically shares the document with the corresponding contact. In some implementations, the document editing system 110 modifies the set of permissions which may, as an example, be stored with or in association with the document in one of the document corpuses 130-1, . . . , 130-x (e.g., as metadata) or in another location, to include permission for the corresponding contact to view and/or edit the document.

At block 260, in response to automatically creating the link, the system sends a notification to the corresponding contact. In some implementations, the document editing system 110 notifies the corresponding contact that they have been linked in the document and/or notifies the corresponding contact that they have been granted permission to view and/or edit the document. For example, the document editing system 110 may cause an email to be sent to the corresponding contact to provide the notification, and/or the document editing system 110 may cause the notification to be presented to the user via a user interface of the document editor on one of the clients 140-1, . . . , 140-n. In other implementations, the document editing system 110 may not send a notification to the corresponding contact.

At block 265, the system receives further user interface input associated with the link. In some implementations, the document editing system 110 receives user interface input (e.g., via one or more of the user interface input devices of one of the clients 140-1, . . . , 140-n) indicating a selection of the link that was created at block 235 (e.g., by a user clicking or tapping on the link or hovering a cursor over the link).

At block 270, in response to receiving the further user interface input associated with the link, the system displays information associated with the corresponding contact in the contact store. In some implementations, in response to receiving the further user interface input associated with the link at block 265, the document editing system 110 causes a card, dialog box, pop-up, tool tip, overlay, or information panel to appear on the user interface of the document editor on one of the clients 140-1, . . . , 140-n that displays information associated with the corresponding contact in one of the contact stores 120-1, . . . , 120-m. In an example, the card, dialog box, pop-up, tool tip, overlay, or information panel may display contact information for the corresponding contact, such as one or more email addresses, physical addresses, telephone numbers, and/or user names, etc. The flow may then return to block 205.

Figure 3:
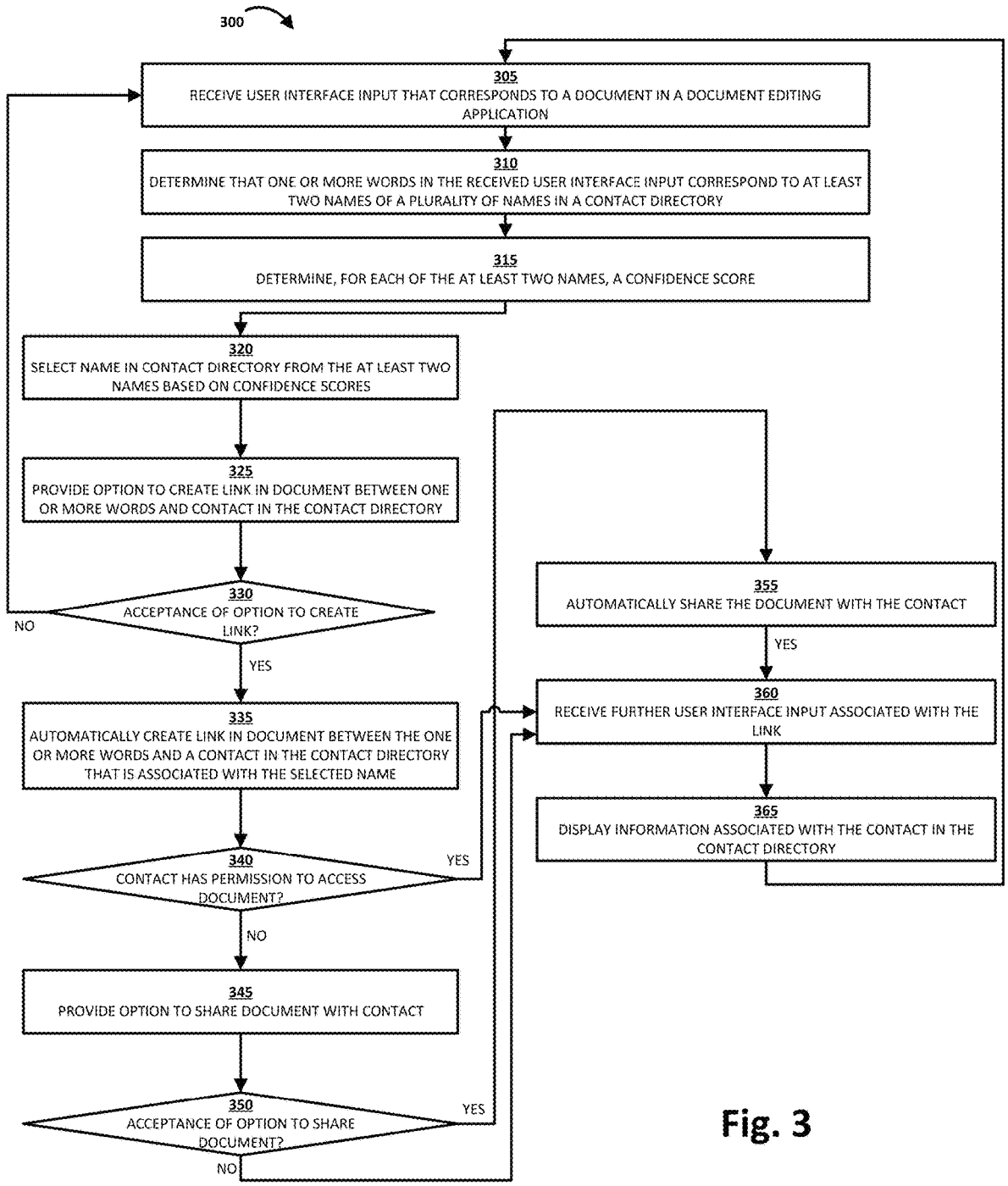

FIG. 3 depicts a flowchart illustrating an example method 300 of automatically providing people suggestions in documents. For convenience, the operations of the method 300 are described with reference to a system that performs the operations. This system of method 300 includes one or more processors and/or other component(s) of various computer systems. Moreover, while operations of method 300 are shown in a particular order, this is not meant to be limiting. One or more operations may be reordered, omitted, or added.

At block 305, the system receives user interface input that corresponds to a document in a document editing application. In some implementations, a document editing application (document editor) rendered by a web browser may be displayed on one or more of the user interface output devices of one of the clients 140-1, . . . , 140-n. The user may use one or more of the user interface input devices of one of the clients 140-1, . . . , 140-n to provide the user interface input that is received by the document editing system 110. In some implementations, the user interface input may include one or more characters or words input into a document in the document editing application via a keyboard (e.g., a physical keyboard or an on-screen keyboard) or a microphone of one of the clients 140-1, . . . , 140-n.

At block 310, the system determines that one or more words in the received user interface input correspond to at least two names of a plurality of names in a contact directory. In some implementations, the document editing system 110 parses the user interface input received at block 305 to identify characters or words input into the document in the document editing system 110 at block 305 that correspond to (e.g., partially or fully match) two or more names of contacts from among a plurality of names of contacts in one or more of the contact stores 120-1, . . . , 120-m. In particular, in some implementations, the document editing system 110 may determine that one or more words in the user interface input received at block 205 corresponds to a first name and/or a last name for two or more contacts in one or more of the contact stores 120-1, . . . , 120-m.

At block 315, the system determines, for each of the at least two names, a confidence score. In some implementations, the document editing system 110 determines, for each of the at least two names in one or more of the contact stores 120-1, . . . , 120-m to which the one or more words in the received user interface input correspond, determined at block 310, a first confidence score associated with the name based upon a strength of the match between the one or more words in the received user interface input and the name. For example, the document editing system 110 may determine a relatively lower confidence score in the case of a partial match between the one or more words and a first name and/or last name of a contact in one or more of the contact stores 120-1, . . . , 120-m, and the document editing system 110 may determine a relatively higher confidence score in the case of a complete match between the one or more words and a first name and a last name of a contact in one or more of the contact stores 120-1, . . . , 120-m.

Still referring to block 315, in some implementations, the document editing system 110 also determines a second confidence score based on a likelihood of the word that was identified at block 310 being a name. The document editing system 110 may determine the second confidence score based on the context of a sentence (or set of words) that surrounds the word that was identified at block 310 (i.e., based on a current sentence that is being typed).

At block 320, the system selects a name in the contact directory from the at least two names based on the confidence scores. In some implementations, the document editing system 110 selects the name in one of the contact stores 120-1, ..., 120-*m* for which the highest first confidence score was determined at block 315. In the example described above in which the document editing system 110 determines the relatively lower first confidence score in the case of the partial match between the name and a first name and/or last name of a contact in one or more of the contact stores 120-1, ..., 120-*m*, and in which the document editing system 110 determines the relatively higher first confidence score in the case of the complete match between the name and a first name and a last name of a contact in one or more of the contact stores 120-1, ..., 120-*m*, at block 320, the document editing system 110 may select the name in one of the contact stores 120-1, ..., 120-*m* that is the complete match. In some implementations, selecting the name in the contact directory is in response to at least one of the first confidence scores satisfying a first threshold and the second confidence score satisfying a second threshold.

At block 325, the system provides an option to create a link in the document between the one or more words and the contact in the contact directory that is associated with the name selected at block 320. In some implementations, the document editing system 110 causes a dialog box, pop-up, tool tip, or overlay to appear on the user interface of the document editor on one of the clients 140-1, ..., 140-*n* that provides the user with the option to create a link that may be selected by clicking or tapping on or adjacent to the name in the document. In other implementations, the document editing system 110 causes the one or more words to appear in a different font and/or color (e.g., gray) on the user interface of the document editor on one of the clients 140-1, ..., 140-*n* to indicate an option to create a link in the document between the one or more words and the contact.

At block 330, the system determines whether or not additional user interface input that indicates acceptance of the option to create the link in the document has been received. In some implementations, the document editing system 110 determines whether or not additional user interface input that indicates acceptance of the option to create the link in the document, provided at block 325, has been received (e.g., via one or more of the user interface input devices of one of the clients 140-1, ..., 140-*n*). If the document editing system 110 determines that the additional user interface input that indicates acceptance of the option to create the link has not been received, then the flow returns to block 305. On the other hand, if the document editing system 110 determines that the additional user interface input that indicates acceptance of the option to create the link has been received, then the flow proceeds to block 335.

At block 335, in response to receiving the additional user interface input that indicates acceptance of the option to create the link in the document, the system automatically creates a link in the document between the one or more words and a contact in the contact directory that is associated with the selected name. In some implementations, in response to receiving the additional user interface input at block 330 that indicates acceptance of the option to create the link in the document, the document editing system 110 automatically creates the link in the document between the one or more words identified at block 310 and the contact in one of the contact stores 120-1, ..., 120-*m* that is associated with the name selected at block 320. In some implementations, automatically creating the link in the document is in response to at least one of the confidence scores satisfying a threshold.

At block 340, in response to automatically creating the link, the system determines whether or not the contact has permission to access the document. In some implementations, in response to automatically creating the link at block 335, the document editing system 110 determines whether or not the contact in one of the contact stores 120-1, ..., 120-*m* that is associated with the name selected at block 320 has permission to access the document (e.g., view and/or edit), for example, based on a set of permissions which may, as an example, be stored with or in association with the document in one of the document corpuses 130-1, ..., 130-*x* (e.g., as metadata) or in another location.

Still referring to block 340, if the document editing system 110 determines that the contact does not have permission to access the document, then the flow proceeds to block 345. On the other hand, if the document editing system 110 determines that the contact has permission to access the document, then the flow proceeds to block 360.

At block 345, in response to determining that the contact does not have permission to access the document, the system provides an option to share the document with the contact. In some implementations, the document editing system 110 causes a dialog box, pop-up, tool tip, or overlay to appear on the user interface of the document editor on one of the clients 140-1, ..., 140-*n* that provides the user with the option to share the document with the contact in one of the contact stores 120-1, ..., 120-*m* that is linked at block 335 and associated with the name selected at block 320.

At block 350, the system determines whether or not further user interface input that indicates acceptance of the option to share the document with the contact has been received. In some implementations, the document editing system 110 determines whether or not further user interface input that indicates acceptance of the option to share the document with the contact in one of the contact stores 120-1, ..., 120-*m*, that is linked at block 335 and associated with the name selected at block 320, has been received (e.g., via one or more of the user interface input devices of one of the clients 140-1, ..., 140-*n*). If the document editing system 110 determines that the further user interface input that indicates acceptance of the option to share the document with the contact has been received, then the flow proceeds to block 355. On the other hand, if the document editing system 110 determines that the further user interface input that indicates acceptance of the option to share the document with the contact has not been received, then the flow proceeds to block 360.

Still referring to block 350, in an example, the further user interface input may include a selection of button (e.g., "Yes" or "Accept" to accept the option to share the document with the contact, or "No" or "Decline" to decline the option to share the document with the contact) in a dialog box, pop-up, tool tip, or overlay provided at block 345. In another example, the further user interface input may include a keystroke or keystroke combination (e.g., tab to accept the option to share the document with the contact, or escape to decline the option to share the document with the contact) or a voice command (e.g., "Accept" or "Decline").

At block 355, in response to receiving the further user interface input that indicates acceptance of the option to share the document with the contact, the system automatically shares the document with the contact. In some implementations, the document editing system 110 modifies the set of permissions which may, as an example, be stored with or in association with the document in one of the document corpuses 130-1, ..., 130-x (e.g., as metadata) or in another location, to include permission for the contact in one of the contact stores 120-1, ..., 120-m that is linked at block 335 and associated with the name selected at block 320 to view and/or edit the document.

At block 360, the system receives further user interface input associated with the link. In some implementations, the document editing system 110 receives further user interface input (e.g., via one or more of the user interface input devices of one of the clients 140-1, ..., 140-n) indicating a selection of the link that was created at block 335 (e.g., by a user clicking or tapping on the link or hovering a cursor over the link).

At block 365, in response to receiving the further user interface input associated with the link, the system displays information associated with the contact in the contact directory. In some implementations, in response to receiving the further user interface input associated with the link at block 360, the document editing system 110 causes a dialog box, pop-up, tool tip, overlay, or information panel to appear on the user interface of the document editor on one of the clients 140-1, ..., 140-n that displays information associated with the contact in one of the contact stores 120-1, ..., 120-m. In an example, the dialog box, pop-up, tool tip, overlay, or information panel may display contact information for the corresponding contact, such as one or more email addresses, physical addresses, telephone numbers, and/or user names, etc. The flow may then return to block 305.

Figure 4A:
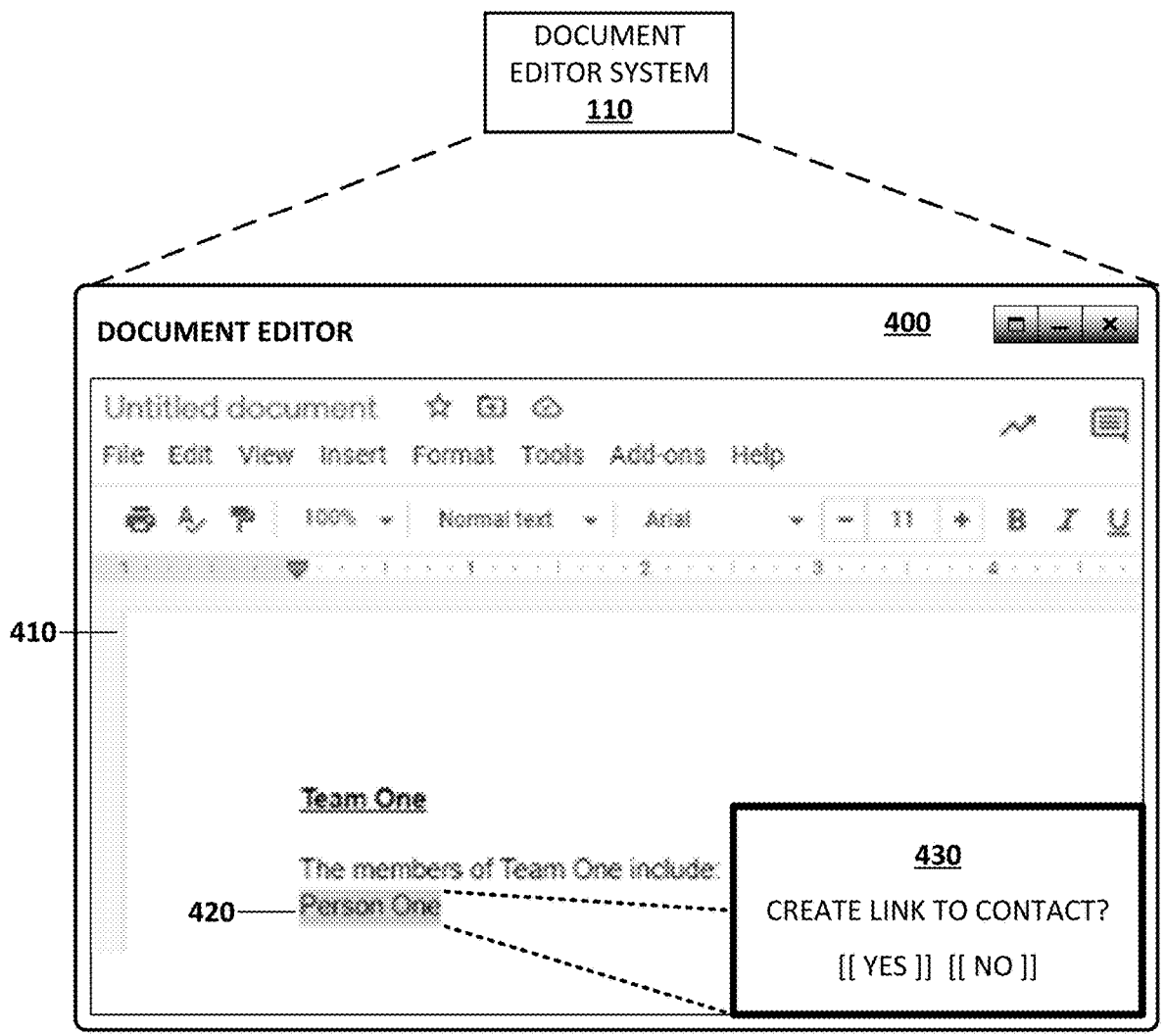
FIG. 4A and FIG. 4B depict an example application of techniques described herein, in accordance with various implementations.
Figure 4B:
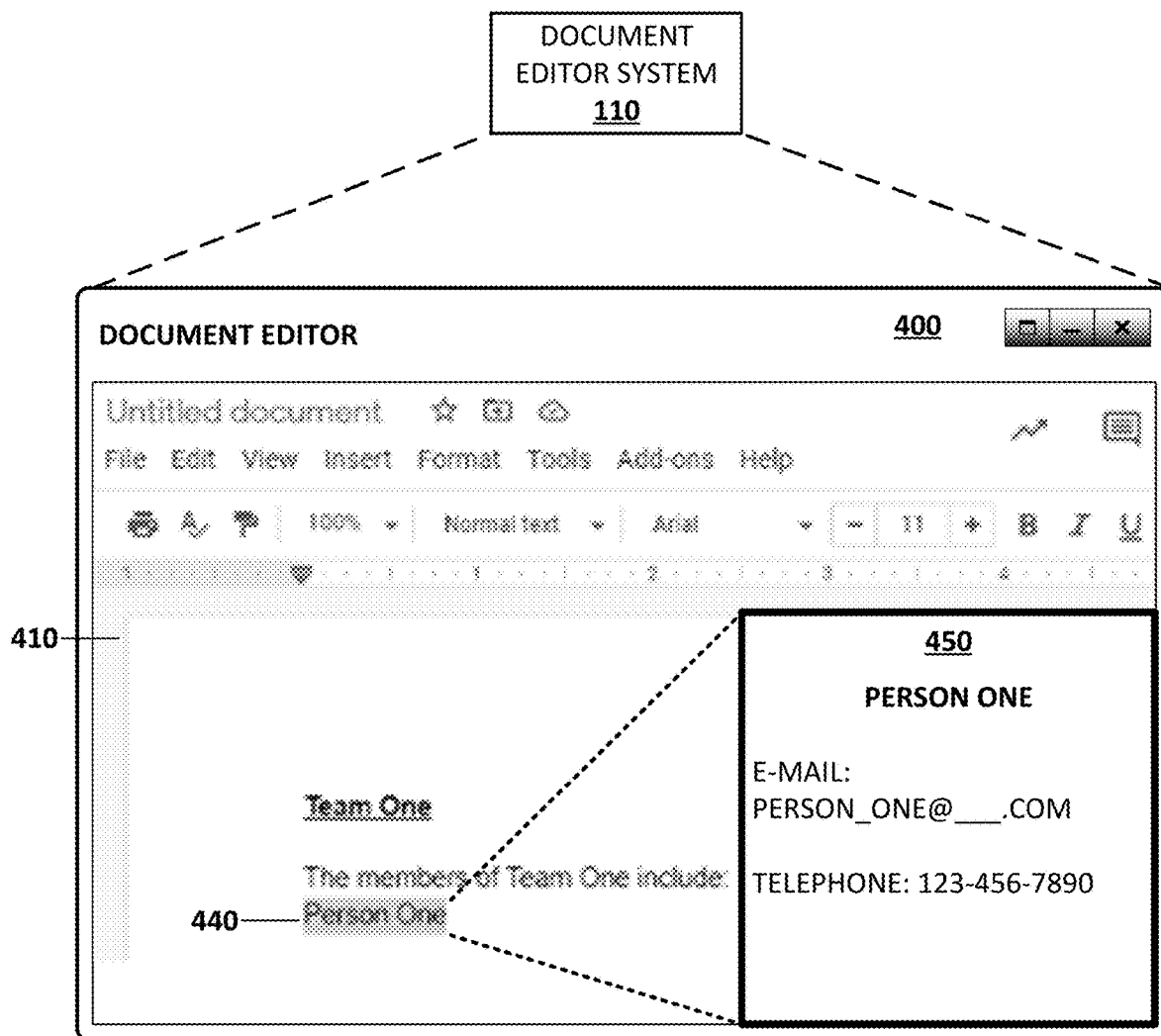

FIGS. 4A and 4B depict an example of how people suggestions may be provided by a document editor system 110 that causes a document editor to be displayed on one or more of the user interface output devices of one of the clients 140-1, ..., 140-n. The scenario of FIGS. 4A and 4B is for illustrative purposes only. In FIGS. 4A and 4B, a graphical user interface ("GUI") 400 is depicted that may be used by a document editor application user to view, create, or edit a document 410 (e.g., "Untitled document").

As shown in FIG. 4A, in some implementations, in response to a user inputting the words "Person One" into the document 410 in the GUI 400 of the document editor application, the document editor system 110 automatically parses the received user interface input to identify a name 420 (e.g., "Person One") that is included in the user interface input. In response to identifying the name 420 included in the user interface input, the document editor system 110 displays a prompt 430 in the GUI 400 that provides an option to create a link in the document between the name and the corresponding contact in one of the contact stores 120-1, ..., 120-m. In response to receiving the additional user interface input that indicates acceptance of the option to create the link in the document, the document editor system 110 automatically creates the link in the document between the name 420 and the corresponding contact in one of the contact stores 120-1, ..., 120-m.

In other implementations, in response to a user inputting the word "Person" into the document 410 in the GUI 400 of the document editor application, the document editor system 110 may automatically parse the received user interface input to identify the first name "Person" that is included in the user interface input. In response to identifying the first name "Person" included in the user interface input, the document editor system 110 may display the prompt 430 in the GUI 400 that provides the option to create the link in the document between the first name "Person" and a corresponding contact "Person One" in one of the contact stores 120-1, ..., 120-m. In response to receiving the additional user interface input that indicates acceptance of the option to create the link in the document, the document editor system 110 automatically completes the name to "Person One" and automatically creates the link in the document between the name "Person One" and the corresponding contact in one of the contact stores 120-1, ..., 120-m.

As shown in FIG. 4B, in some implementations, in response to receiving further user interface input associated with a link 450 between the name 420 and the corresponding contact in one of the contact stores 120-1, ..., 120-m (e.g., by a user clicking or tapping on the link 450 or hovering over the link 450), the document editor system 110 displays, in the GUI 400, an information card 450 that includes information associated with the contact in the contact store that is associated with the name 420.

Figure 5:
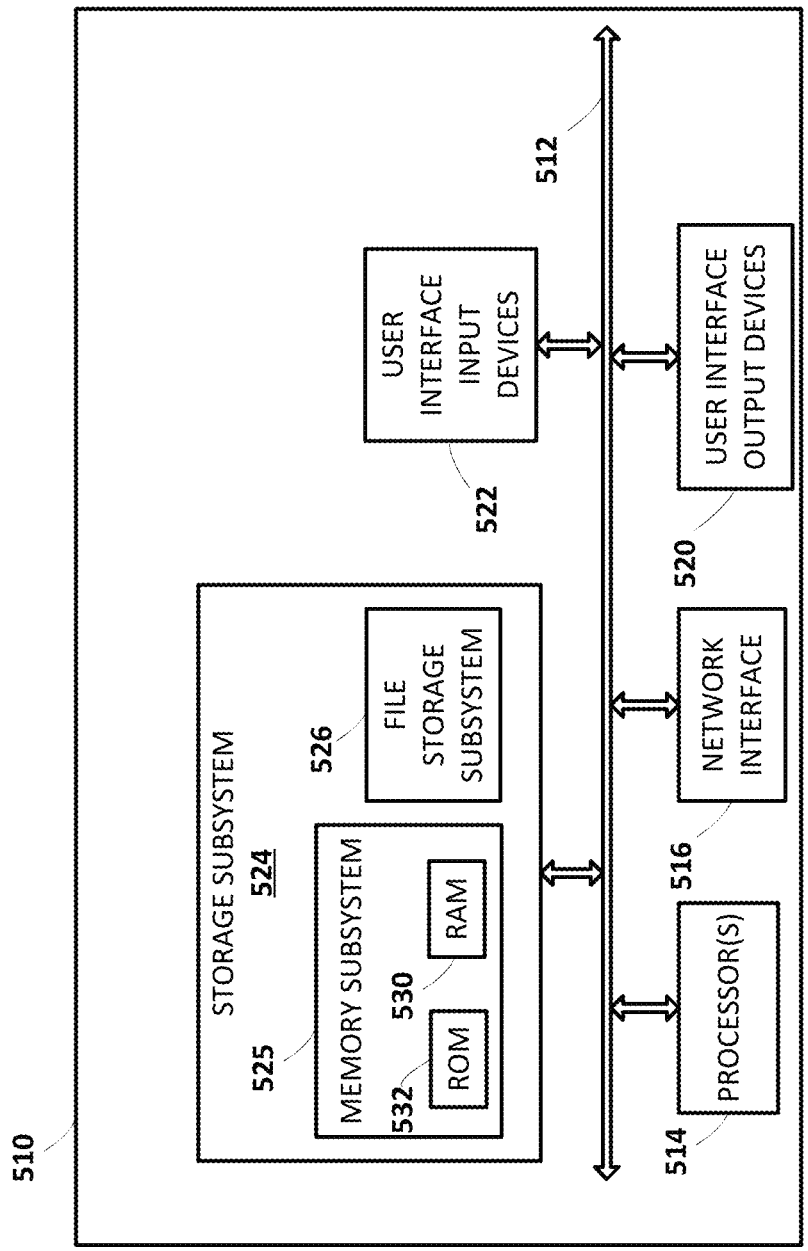
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2 and 3, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 610 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving user interface input that corresponds to a document in a document editing application;
   based on receiving the user interface input, automatically parsing the received user interface input to identify a name candidate included in the user interface input;
   determining a first confidence score, associated with the name candidate, based on a strength of a match between the name candidate and a corresponding contact in a contact store;
   determining a second confidence score, associated with the name candidate, based on a likelihood of the name candidate that is identified in the received user interface input being a person's name, the second confidence score being determined using context comprising a sentence or a set of words that surrounds the name candidate; and
   in response to identifying the name candidate included in the user interface input and based on the first confidence score satisfying a first threshold and the second confidence score satisfying a second threshold, providing an option to create a link in the document between the name candidate and the corresponding contact in the contact store.

2. The method according to claim 1, further comprising:
   receiving first additional user interface input that indicates acceptance of the option to create the link in the document; and
   in response to receiving the first additional user interface input, automatically creating the link in the document between the name candidate and the corresponding contact in the contact store.

3. The method according to claim 2, further comprising, in response to automatically creating the link, sending a notification to the corresponding contact.

4. The method according to claim 2, further comprising:
   in response to automatically creating the link, determining whether or not the corresponding contact has permission to access the document; and
   in response to determining that the corresponding contact does not have permission to access the document, providing an option to share the document with the corresponding contact.

5. The method according to claim 4, further comprising:
   receiving further user interface input that indicates acceptance of the option to share the document with the corresponding contact, wherein a particular user provides both the user interface input and the further user interface input; and
   in response to receiving the further user interface input, automatically sharing the document with the corresponding contact.

6. The method according to claim 1, wherein automatically parsing the received user interface input to identify the name candidate included in the user interface input comprises determining that one or more words in the received user interface input corresponds to at least a first name or a last name of the corresponding contact in the contact store.

7. A computer program product comprising one or more non-transitory computer-readable storage media having program instructions collectively stored on the one or more computer-readable storage media, the program instructions executable to:
   receive user interface input that corresponds to a document in a document editing application;
   based on receiving the user interface input, automatically parse the received user interface input to identify a name candidate included in the user interface input;
   determine a first confidence score, associated with the name candidate, based on a strength of a match between the name candidate and a corresponding contact in a contact store;
   determine a second confidence score, associated with the name candidate, based on a likelihood of the name candidate that is identified in the received user interface input being a person's name, the second confidence score being determined using context comprising a sentence or a set of words that surrounds the name candidate; and
   in response to identifying the name candidate included in the user interface input and based on the first confidence score satisfying a first threshold and the second confidence score satisfying a second threshold, provide an option to create a link in the document between the name candidate and the corresponding contact in the contact store.

8. The computer program product according to claim 7, wherein the program instructions are further executable to:
receive first additional user interface input that indicates acceptance of the option to create the link in the document; and
in response to receiving the first additional user interface input, automatically create the link in the document between the name candidate and the corresponding contact in the contact store.

9. The computer program product according to claim 8, wherein the program instructions are further executable to, in response to automatically creating the link, send a notification to the corresponding contact.

10. The computer program product according to claim 8, wherein the program instructions are further executable to:
in response to automatically creating the link, determine whether or not the corresponding contact has permission to access the document; and
in response to determining that the corresponding contact does not have permission to access the document, provide an option to share the document with the corresponding contact.

11. The computer program product according to claim 10, wherein the program instructions are further executable to:
receive further user interface input that indicates acceptance of the option to share the document with the corresponding contact, wherein a particular user provides both the user interface input and the further user interface input; and
in response to receiving the further user interface input, automatically share the document with the corresponding contact.

12. The computer program product according to claim 7, wherein automatically parsing the received user interface input to identify the name candidate included in the user interface input comprises determining that one or more words in the received user interface input corresponds to at least a first name or a last name of the corresponding contact in the contact store.

13. A system comprising:
a processor, a computer-readable memory, one or more computer-readable storage media, and program instructions collectively stored on the one or more computer-readable storage media, the program instructions executable to:
receive user interface input that corresponds to a document in a document editing application;
based on receiving the user interface input, automatically parse the received user interface input to identify a name candidate included in the user interface input;
determine a first confidence score, associated with the name candidate, based on a strength of a match between the name candidate and a corresponding contact in a contact store;
determine a second confidence score, associated with the name candidate, based on a likelihood of the name candidate that is identified in the received user interface input being a person's name, the second confidence score being determined using context comprising a sentence or a set of words that surrounds the name candidate; and
in response to identifying the name candidate included in the user interface input and based on the first confidence score satisfying a first threshold and the second confidence score satisfying a second threshold, provide an option to create a link in the document between the name candidate and the corresponding contact in the contact store.

14. The system according to claim 13, wherein the program instructions are further executable to:
receive first additional user interface input that indicates acceptance of the option to create the link in the document; and
in response to receiving the first additional user interface input, automatically create the link in the document between the name candidate and the corresponding contact in the contact store.

15. The system according to claim 14, wherein the program instructions are further executable to, in response to automatically creating the link, send a notification to the corresponding contact.

16. The system according to claim 14, wherein the program instructions are further executable to:
in response to automatically creating the link, determine whether or not the corresponding contact has permission to access the document; and
in response to determining that the corresponding contact does not have permission to access the document, provide an option to share the document with the corresponding contact.

17. The system according to claim 16, wherein the program instructions are further executable to:
receive further user interface input that indicates acceptance of the option to share the document with the corresponding contact, wherein a particular user provides both the user interface input and the further user interface input; and
in response to receiving the further user interface input, automatically share the document with the corresponding contact.

18. The system according to claim 13, wherein automatically parsing the received user interface input to identify the name candidate included in the user interface input comprises determining that one or more words in the received user interface input corresponds to at least a first name or a last name of the corresponding contact in the contact store.

* * * * *